(12) United States Patent
Disson et al.

(10) Patent No.: US 9,440,172 B2
(45) Date of Patent: Sep. 13, 2016

(54) FILTER ELEMENT

(71) Applicant: Mahle International GmbH, Stuttgart (DE)

(72) Inventors: Ralf Disson, Leutenbach (DE); Hannes Lay, Beuren (DE); Bernd Neubauer, Rudersberg (DE); Birgit Renz, Marbach (DE); Markus Steppe, Malmsheim (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/426,603

(22) PCT Filed: Aug. 16, 2013

(86) PCT No.: PCT/EP2013/067103
§ 371 (c)(1),
(2) Date: Mar. 6, 2015

(87) PCT Pub. No.: WO2014/037205
PCT Pub. Date: Mar. 13, 2014

(65) Prior Publication Data
US 2015/0246306 A1   Sep. 3, 2015

(30) Foreign Application Priority Data
Sep. 7, 2012   (DE) .................. 10 2012 215 877

(51) Int. Cl.
*B01D 39/00* (2006.01)
*B01D 39/18* (2006.01)
*B01D 39/16* (2006.01)

(52) U.S. Cl.
CPC ........... *B01D 39/18* (2013.01); *B01D 39/1623* (2013.01); *B01D 2239/025* (2013.01);
(Continued)

(58) Field of Classification Search
CPC .............. B01D 39/18; B01D 39/1615; B01D 39/1623; B01D 39/2082; B01D 39/2017; B01D 39/2041
USPC ........ 55/486, 524; 210/335, 435, 490, 416.4
See application file for complete search history.

(56) References Cited

U.S. PATENT DOCUMENTS 5,690,823 A * 11/1997 Reipur ................... B01D 35/10
 210/321.79
2003/0150199 A1* 8/2003 Tanaka ............... B01D 39/1623
 55/486

(Continued)

FOREIGN PATENT DOCUMENTS

DE   69013168 T2   2/1995
DE   10245124 A1   2/2004
(Continued)

OTHER PUBLICATIONS

English Abstract for EP 1366791.
(Continued)

*Primary Examiner* — Robert Clemente
*Assistant Examiner* — Karla Hawkins
(74) *Attorney, Agent, or Firm* — Fishman Stewart PLLC

(57) ABSTRACT

A filter element for a filter device may include a filter body having at least one filter material for filtering a fluid. The filter body may have a first side and a second side facing away from the first side. The filter body may include a plurality of body pores. The filter body may have a porosity that is lower on the first side than on the second side. A nano-fiber layer may be disposed at least partially on the first side.

20 Claims, 3 Drawing Sheets

(52) U.S. Cl.
CPC ... *B01D2239/065* (2013.01); *B01D 2239/083* (2013.01); *B01D 2239/1208* (2013.01); *B01D 2239/1216* (2013.01)

(56) References Cited

U.S. PATENT DOCUMENTS

| | | | | |
|---|---|---|---|---|
| 2005/0061723 | A1* | 3/2005 | Matsushita | B01D 29/072 210/171 |
| 2008/0086992 | A1 | 4/2008 | Walz | |
| 2008/0264258 | A1 | 10/2008 | Mares et al. | |
| 2010/0119794 | A1* | 5/2010 | Manstein | B01D 46/02 428/219 |
| 2011/0064928 | A1* | 3/2011 | Bonneh | A61F 13/511 428/212 |

FOREIGN PATENT DOCUMENTS

| | | |
|---|---|---|
| DE | 60111554 T2 | 5/2006 |
| DE | 202005019004 U1 | 4/2007 |
| DE | 202007015994 U1 | 1/2008 |
| DE | 102006048076 A1 | 4/2008 |
| DE | 102007023806 A1 | 11/2008 |
| DE | 102008035934 A1 | 2/2009 |
| DE | 102009050447 A1 | 4/2011 |
| EP | 1366791 A1 | 12/2003 |
| EP | 1911960 A2 | 4/2008 |
| WO | WO-2006049664 A1 | 5/2006 |
| WO | WO-2008034190 A1 | 3/2008 |

OTHER PUBLICATIONS

English Abstract for DE 69013168.
English Abstract for DE 102008035934.
English Abstract for DE 102007023806.
English Abstract for DE 102006048076.
English Abstract for DE 10245124.
English Abstract for DE 102009050447.
English Abstract for DE 60111554.
European Office Action for EP-13753138.0, dated Apr. 14, 2016.

* cited by examiner

FILTER ELEMENT

CROSS-REFERENCE TO RELATED APPLICATIONS

This application claims priority to German Patent Application No. 10 2012 215 877.4, filed Sep. 7, 2012, and International Patent Application No. PCT/EP2013/067103, filed Aug. 16, 2013, both of which are hereby incorporated by reference in their entirety.

TECHNICAL FIELD

The present invention relates to a filter element for a filter device, said filter element having a filter body for filtering a fluid.

BACKGROUND

Filter devices are used in numerous applications in order to clean different fluids. Of particular interest are in particular vehicle applications. For this purpose, such a filter device usually has a filter element which filters the fluid and/or separates it from contaminants, dirt particles and the like. Such a filter element can be used for cleaning a fluid, in particular oil or water, or can be used for filtering a gas such as air, for example. For this, the filter element has a filter body which permits filtering the fluid due to the structural configuration or physical and/or chemical properties of the filter body. The filter body can be formed from at least one filter material or can at least comprise such a filter material which has in particular the mentioned structural, physical and/or chemical properties. Moreover, it is principally conceivable to provide the filter body or the filter material with pores or to select a filter body having pores so as to enable a flow of the fluid passing through the filter body and to sift or filter contaminants or dirt particles out of the fluid.

Furthermore, it is conceivable to provide the filter element with a nano-fiber layer so as to improve in particular the filter properties of the filter element. The disadvantage of such a filter element is in particular that in the case of high flow velocities of the fluid, the stability of the nano-fiber layer is insufficient so that dirt particles or contaminants of the fluid can cause damage to the nano-fiber layer and/or the filter body.

The present invention is concerned with the problem of providing an improved or at least a different embodiment for a filter element of the aforementioned kind, which is in particular characterized by increased stability. In addition, cost-effective production is to be ensured.

The mentioned problem is solved according to the invention by the subject matter of the independent claims. Advantageous embodiments are subject matter of the dependent claims.

SUMMARY

The present invention is based on the general idea of applying a nano-fiber layer of a filter element on that side of a filter body of the filter element that has better carrier properties for the nano-fiber layer so as to thereby achieve increased stability of the nano-fiber layer and/or to ensure improved application of the nano-fiber layer on the filter body. The filter element can have any shape. Preferably, the filter element has a rectangular, round, oval or a horseshoe-shaped contour. In other configurations, the filter element can also be formed as a wound filter with alternately closed channels. Here, the filter element comprises the aforementioned filter body that serves for filtering a fluid and comprises at least one filter material. Furthermore, the filter body or the filter material has porosity. This means that the filter body has cavities such as, for example, pores, wherein the porosity indicates the ratio between the cavity proportion and the total proportion of the filter body. Moreover, the filter body is designed according to the invention in such a manner that the porosity is less on a first side of the filter body than on a second side of the filter body, which second side faces away from the first side. In other words: the cavity proportion of the filter body is less on the first side than on the second side, as a result of which the first side is more compact and in particular denser and more stable than the second side. According to the invention, the nano-fiber layer is applied on the first side and therefore on the side having the smaller cavity proportion of the filter body. On the one hand, this results in the fact that the nano-fiber layer, in particular in comparison to an application on the second side, is better secured or is better supported by the filter body. Therefore, the nano-fiber layer can withstand a stronger flow and thus can withstand contaminants or dirt particles with higher impulses. Moreover, the first side having the lower porosity provides better conditions for the application of the nano-fiber layer so that improved applying of the nano-fiber layer and/or applying such a nano-fiber layer with increased stability is possible on this side.

The lower porosity of the first side in comparison to the second side of the filter body usually also means that the density of the filter body on the first side is greater than on the second side. This applies in particular if the filter body comprises only one such filter material. However, the filter body can also comprise two or more different filter materials or material compositions. The lower porosity of the first side does not necessarily mean that the first side has a higher density than the second side, in particular in cases where the filter body has a lighter filter material or a filter material with a lower density on the first side than on the second side.

As mentioned before, porosity of the filter body means that the filter body or the at least one filter material has a cavities. These cavities can be present in particular in the form of pores, which hereinafter are designated as body pores. Here, the aforementioned body pores can be distributed arbitrarily in the filter body if the first side has a lower porosity than the second side. Moreover, the respective pores can have different sizes and/or shapes. In particular, the body pores can be formed as micropores with dimensions in the one- to two-digit micrometer range.

The lower porosity of the filter body on the first in comparison to the second side can occur, for example, because an average size of the body pores of the filter body on the first side is smaller than the average size of the body pores on the second side. This means in particular that the body pores or cavities are smaller on the first side than on the second side. Alternatively or additionally, the number of body pores can be less on the first side than on the second side. In particular, with a uniform average pore size, the body pore density of the filter body is lower on the first side than on the second side.

The lower porosity of the filter body on the first side in comparison to the second side preferably results in the fact that the first side is formed to be smoother or flatter than the second side. The smoother or flatter formation of the first side which, in particular, can result in increased compactness of the first side, provides improved conditions for applying the nano-fiber layer on the first side and/or better supports the nano-fiber layer.

The filter element according to the invention can be arranged as desired in an associated filter device, and a flow of fluid to be filtered can pass through as desired. However, those embodiments are preferred in which first side corresponds to the side against which the fluid to be filtered flows. In other words: in the state arranged in the filter device, the first side corresponds to a dirty side of the filter device against which the fluid to be filtered flows. Accordingly, the second side can correspond to a clean side from where the filtered filter medium flows out. In this case, due to the low porosity of the first side, in particular when the first side has a higher density in comparison to the second side, the filter device can be designated as a surface filter, wherein filtering of the fluid takes place primarily on the first side. This means that the dirt particles or contaminants of the fluid to be filtered are filtered or separated from the fluid primarily on the first side or in the region of the first side and accumulate there. Accordingly, the filter element can be cleaned by means of backflushing in that a fluid flows in the opposite flow direction through the filter element, for example. This fluid, which can be designated as cleaning fluid, thus flows out of the filter element on the first side so that the aforementioned contaminants or dirt particles can be flushed out of the filter element. As a result, it is possible to increase the service life of the filter element and to improve the filtering effect of the filter element.

Of course, it is also possible to arrange the filter element in the associated filter device in such a manner that it functions as a depth filter in which the first side corresponds to the clean side whereas the second side can correspond to the dirty side. However, in this case, the aforementioned cleaning by means of backflushing is made more difficult.

The reason for the lower porosity of the filter body on the first side in comparison to the second side can be that the porosity varies along the filter body, in particular along a flow direction of the fluid to be filtered. In principle, all variations within the filter body are conceivable here if the porosity is lower on the first side than on the second side. Thus, the porosity of the filter body can increase from the first side towards the second side in a step-like manner at least in some sections. This may in particular be due to the fact that the filter body is produced in multiple layers or plies from two or more filter materials with different porosities. It is in particular conceivable here that the porosity of the filter body is greater inside the filter body than on the second side. Furthermore, the porosity of the filter body can be less inside the filter body than on the first side. The step-like change in porosity of the filter body is caused, for example, by a corresponding step-like change in average size and/or in the number of body pores of the filter body from the first towards the second side. The step-like change in porosity can also be caused by adding filter particles in the filter body, wherein reference is made to carbon particles or activated carbon particles as an example for such filter particles. The step-like change in porosity of the filter body can also depend on the production of the filter body. Thus, it is conceivable that the filter body is produced from the same or different filter materials in two or more steps, wherein the respective transition between the production steps results in such a step-like variation of the porosity of the filter body.

As an alternative, the porosity of the filter body can continuously vary from the first side towards the second side at least in some sections. This means that the porosity of the filter body decreases or increases gradually within the filter body at least in some sections if the porosity is less on the first side than on the second side.

Such a continuous change in porosity can in particular be related to the production of the filter body, in particular of the at least one filter material. Such a production can comprise, for example, screening or skimming the filter material from the associated filter base material. Here, the filter material can be skimmed or screened from a filter material liquid containing the filter base material. In other embodiments, the filter material can be produced from a filter material-gas mixture. This can be carried out by placing the filter material mixture onto a screen belt, for example. In such methods, the filter material liquid or the filter material-gas mixture flows in one direction, in particular driven by gravity and/or low-pressure or suction, so that more filter material can accumulate on the respective side than on the opposite side. This results in the fact that one side has a higher proportion of filter material than the other side, which results in different porosities within the filter material. Hereby, the porosity usually decreases and/or increases continuously, wherein the side with the lower porosity corresponds to the first side of the filter body. Such a method can also be carried out in successive steps, which can result in the above-mentioned step-like change in porosity. Such a step-like change in porosity can also be caused in that the filter body has two or more filter materials with different porosities, wherein the porosity within the respective filter materials can vary or can be uniform or constant, in particular in the way as described above.

Basically, the filter body can be produced from any such filter material and/or can have any size and/or shape. Thus, the filter body can be produced by folding and/or can be formed asymmetrically. The filter body, in particular the filter material, can also be impregnated and/or can have a smooth, a cam-like, knob-like or groove-like structure. If the filter body has a grooved structure, the respective grooves have a random depth, wherein those embodiments are preferred that have a depth greater than 0.4 mm. Here, the sequence of the individual operational steps for shaping the filter body or the respective filter material in such a manner is arbitrary.

In preferred embodiments, the filter body is made from a fiber-containing material. This means in particular that at least one filter material corresponds to the fiber-containing material. Such a filter body is preferably skimmed or screened from an associated filter material liquid by means of the aforementioned method. As an alternative, the filter body can be made from a filter material which is formed as flat web material and can be pleated. Such a web material is typically available as reels for filter production.

Here, any fiber-containing materials can be used, wherein in particularly preferred embodiments, the filter body or the filter material is made from cellulose-containing material or the at least one filter material corresponds to a cellulose-containing material. However, embodiments in which the filter body is made from a fiber mixture from cellulose and/or synthetic fibers are also conceivable. Alternatively or additionally, the filter body or the filter material can also comprise fiberglass and the like or can be made from fiberglass. According to further configurations, the filter material can be formed from polymer foam.

In addition to the basic material, the above-described filter materials can also include admixtures of other substances. The admixtures can be provided as fibers or particles, wherein the admixtures can be composed of plastics, glass, graphite, zeolite or mineral substances. In the case of a filter body or a fiber-containing filter material, the application of the nano-fiber layer on the first side has in particular the advantage that on this side, there is a lower number of fiber ends of the filter body compared to the second side. These fiber ends are in particular free fiber ends which cause damage to the nano-fiber layer by penetrating into or through the nano-fiber layer. Thus, this is counteracted according to the invention by applying the nano-fiber layer on that side of the filter body that has less porosity, thus on the first side, and accordingly has a lower number of fiber ends.

For reducing the fiber ends, the filter material can be or is pretreated, in particular on the first side and preferably prior to applying the nano-fiber layer. Such a pretreatment can include etching the fiber-containing filter material, for example. Alternatively or additionally, an acid treatment can be carried out. Hereby, dulling or blunting or deburring of the corners and/or edges of the fibers can be achieved in addition to the reduction of the number of fiber ends. Flaming or singing the fiber ends can also help in reducing the number of fiber ends.

The reduced number of fiber ends can also be implemented by using a different filter material on the first side than on the second side. The filter material is selected such that there are less fiber ends on the first side.

It can in particular be provided that on the first side a filter material is used which has softer and more rounded fibers, in particular, fiber ends.

Also, a filter material with filament can be used on the first side. The length of such a filament results in particular in the fact that the number of fibers and thus of the fiber ends is reduced. Any filament can be used for this purpose. Continuous filaments and spunbonds are referenced in this connection as examples.

Suitable production of the fiber-containing filter material can also help reducing the number of free or protruding fiber ends. This includes for instance using a pressing process so as to treat a backing paper of the filter body or the filter material during production, for example. Thus, in the process of this, a filter material is produced that has at least one smooth side so that the filter material has less fiber ends or free fiber ends. Furthermore, during a winding process during the production of the filter material, in particular of the fibers, a separation layer can be used so as to avoid damage to the fibers.

In another variant, suitable selection of a fiber material helps reducing the fiber ends. This can be achieved, for example, by selecting a fiber material comprising a comparatively ductile resin.

Furthermore, it is conceivable to apply a fiber-containing top layer on the first side onto which subsequently the nano-fiber layer is applied. The top layer results in particular in the fact that the overall structure of the first side becomes smoother and thus has less fiber ends. The top layer, in turn, can contain fibers, wherein the fibers of the top layers are not necessarily configured so as to be functional and do not have to contribute to the filtering process, for example. Likewise, it is conceivable that the top layer is fiber-free. In this variant, the top layer can contain lacquer and/or resin and/or an adhesive, for example.

The nano-fiber layer generally comprises any kind of fibers or nano-fibers provided that the respective nano-fibers of the nano-fiber layer have an adequate dimension and in particular a diameter of up to several hundred nanometers, preferably less than 500 nm. Furthermore, the nano-fiber layer is not necessarily applied on the entire first side of the filter body. Thus, embodiments are conceivable in which a plurality of nano-fiber layers which are separated or spaced apart from one another are applied on the first side of the filter body, for example. Here, the respective nano-fiber layers which are separated from one another can be designated as nano-fiber particles which can be randomly distributed on the first side, wherein embodiments are preferred in which the aforementioned nano-fiber particles are uniformly distributed on the first side of the filter body. As an alternative, a continuous nano-fiber layer which does not cover the filter material in specific sections can also be provided. For this purpose, recesses of any contour or nano-fiber-free sections can be provided at the edges of the filter body. Furthermore, the respective nano-fiber particles can have any size and/or shape. In particular, the respective nano-fiber particles have sizes in the two-digit micrometer range and are 50 µm long and/or wide, for example.

Producing the nano-fiber layer can be carried out in a manner generally known per se. This includes electro spinning or melt spinning, for example.

The nano-fiber layer or the nano-fiber particles can also have porosity, wherein the porosity of the nano-fiber layer is preferably less than the porosity of the filter body and in particular less than the porosity of the filter body on the first side. In this way it is in particular possible to filter out smaller contaminants or dirt particles from the fluid to be cleaned than is possible with the filter body.

Analog to the porosity of the filter body, the porosity of the nano-fiber layer can be caused by pores of the nano-fiber layer, which are designated hereinafter as nano-fiber pores. Embodiments are preferred here in which the nano-fiber pores of the nano-fiber layer are smaller than the body pores of the filter body.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical or similar or functionally identical components.

BRIEF DESCRIPTION OF THE DRAWINGS

In the figures, schematically

DETAILED DESCRIPTION

Figure 1:
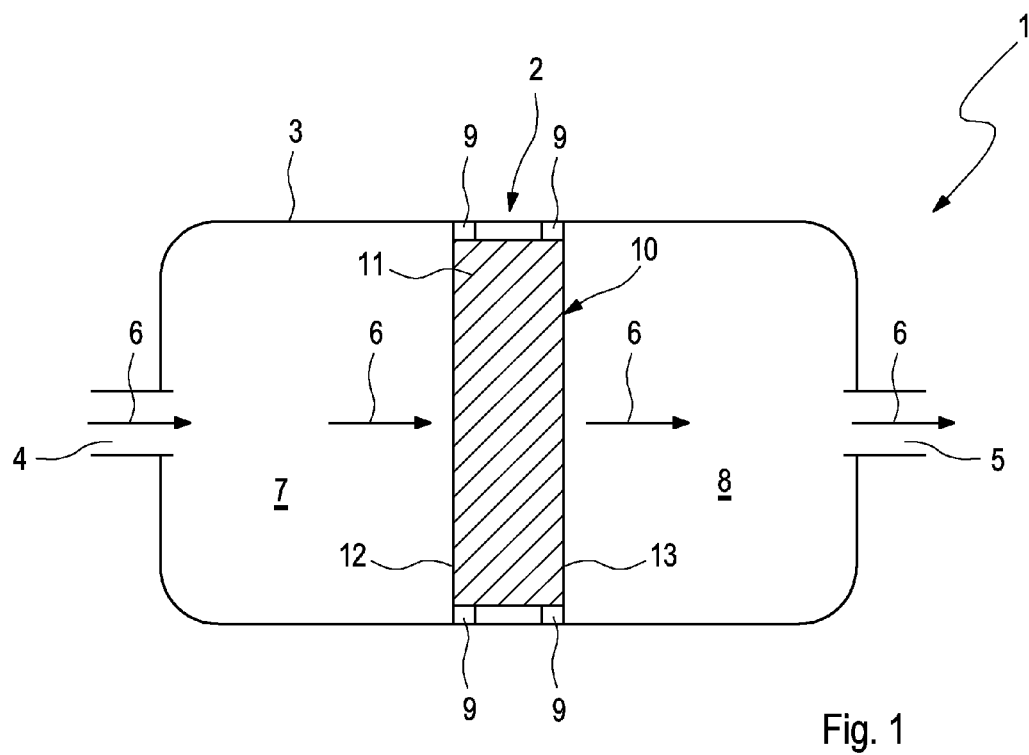
FIG. 1 shows a section through a filter device with a filter element.

FIG. 1 shows a section through a filter device 1 which, for example, can be configured as a liquid filter for filtering water or oil, or as a gas filter for filtering air for a motor vehicle. For filtering the respective fluid, the filter device 1 has a filter element 2 that is arranged in a housing 3 of the filter device 1. The filter device 1 further has a fluid inlet 4 and a fluid outlet 5 that are formed on opposite sides of the housing 3. As indicated by the arrows 6, the fluid to be filtered flows through the fluid inlet 4 into the housing 3 and arrives at the filter element 2 where it is filtered, and subsequently it leaves the filter device 1 through the filter outlet 5. Thus, the filter device 1 or the housing 3 is divided into two regions by means of the filter element 2: The region adjacent to the fluid inlet 4 forms a dirty side 7 whereas the region adjacent to the fluid outlet 5 forms the clean side 8. The filter element 2 is retained or fixed in the housing 3 by means of holding means 9, wherein the holding means 9 are configured to be fluid-tight so that the fluid to be cleaned can flow from the dirty side 7 to the clean side 8 only through the filter element 2. The filter element 2 has a filter body 10 which is formed from at least one filter material 11 or comprises this filter material 11. Moreover, a first side 12 of the filter element 2 or the filter body 10 is arranged on or corresponds to the dirty side 7, whereas a second side 13 facing away from the first side 12 is arranged on or corresponds to the clean side 8. This means that the fluid to be filtered flows into the filter element 2 or the filter body 10 on the first side 12, and flows out of the filter element 2 or the filter body 10 on the second side 13, wherein the first side 12 and the second side 13 of the filter body 10 correspond to the first side 12 and the second side 13, respectively, of the corresponding filter material 11.

Figure 2:
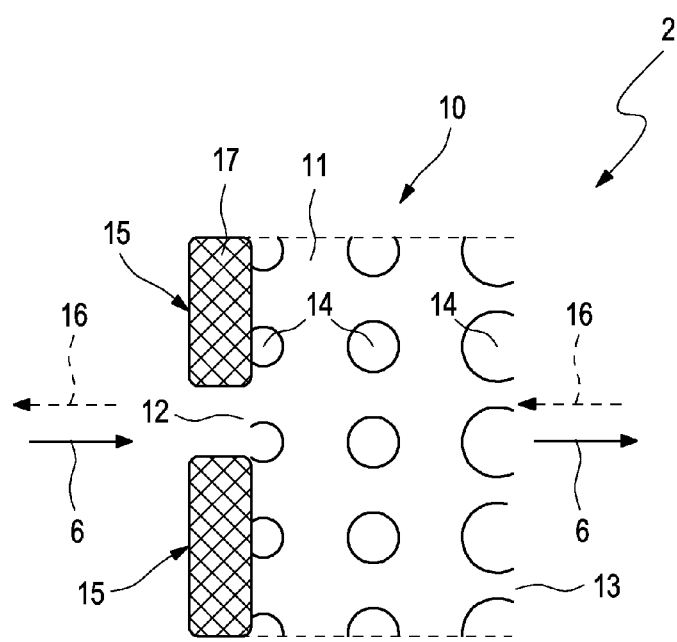
FIGS. 2-5 each show a section through a filter element, for different embodiments.
Figure 3:
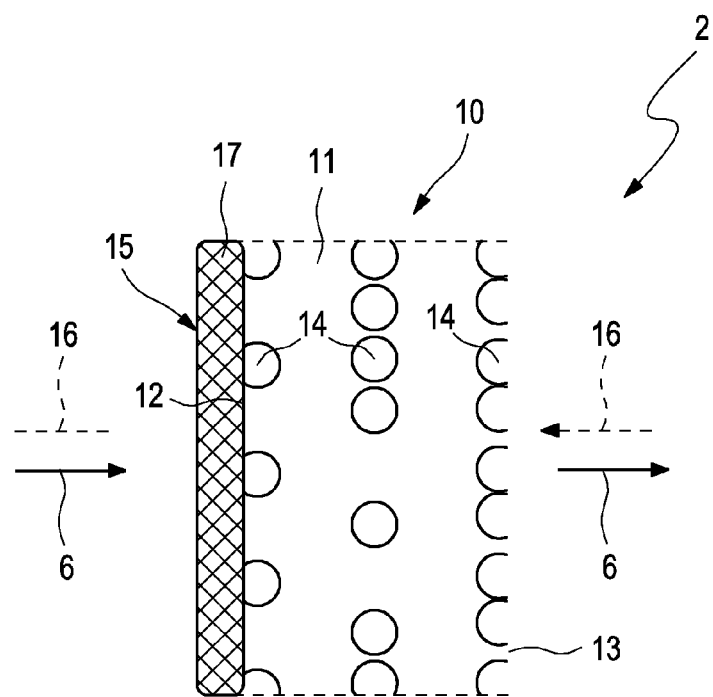
Figure 4:
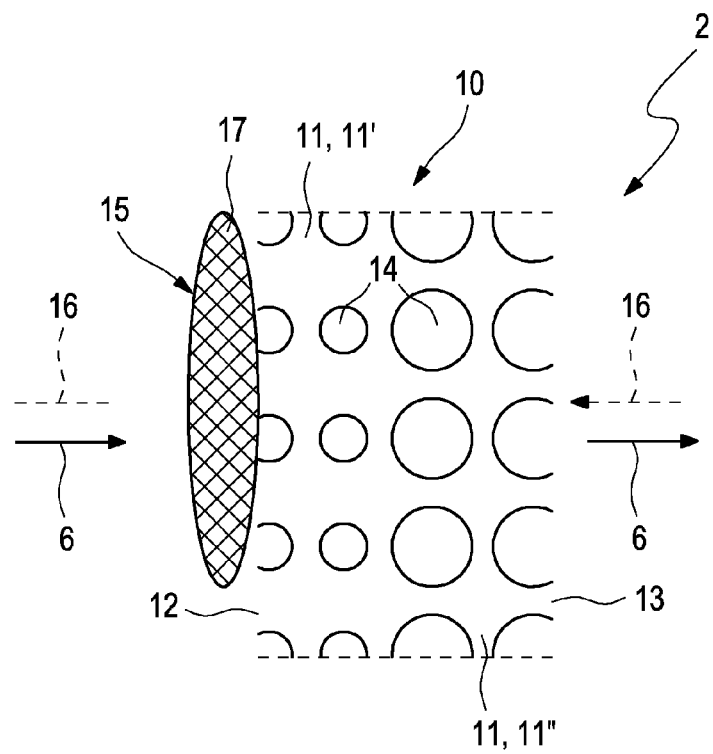

The FIGS. 2 to 4 each show a section through such a filter element 2, wherein different embodiments of the filter element 2 are illustrated in the respective figures. These figures show cut-outs of the first side 12 and the second side 13. It can be observed here that the filter body 10 or the filter material 11 has cavities or pores 14 which are designated hereinafter as body pores 14, wherein the circular body pores 14 in the respective figures are illustrated purely as examples. The filter body 10 or the filter material 11 thus has a porosity which indicates the ratio of the cavity proportion or body pore proportion to the total proportion of the filter body 10 or the filter material 11. It can be observed here that the porosity is less on the first side 12 than on the second side 13.

In the embodiment shown in FIG. 2, the lower porosity on the first side 12 in comparison to the second side 13 is implemented in that the size of the body pores 14 continuously increases from the first side 12 towards the second side 13 while the quantity remains the same, which results in a continuous increase of porosity from the first side 12 towards the second side 13. In the embodiment shown in FIG. 3, the respective body pores 14 are equally sized whereas the number of body pores 14 continuously increases from the first side 12 towards the second side 13. Thus, the porosity increases continuously from the first side 12 towards the second side 13.

In the embodiment shown in FIG. 4, the filter body 10 has two differently sized types of body pores 14. The smaller body pores 14 are arranged in the region of the first side 12 whereas the larger body pores 14 are arranged in the region of the second side 13. This, for example, can be due to the fact that the filter body 10 in the region of the first side 12 is made from a different filter material 11' than in the region of the second side 13, which is made from a different filter material 11". Thus, the filter material 11' provided in the region of the first side 12 has smaller body pores 14, whereas the other filter material 11", which is arranged in the region of the second side 13, has larger body pores 14. Thus, here too, the porosity is lower on the first side 12 than on the second side 13.

Figure 5:
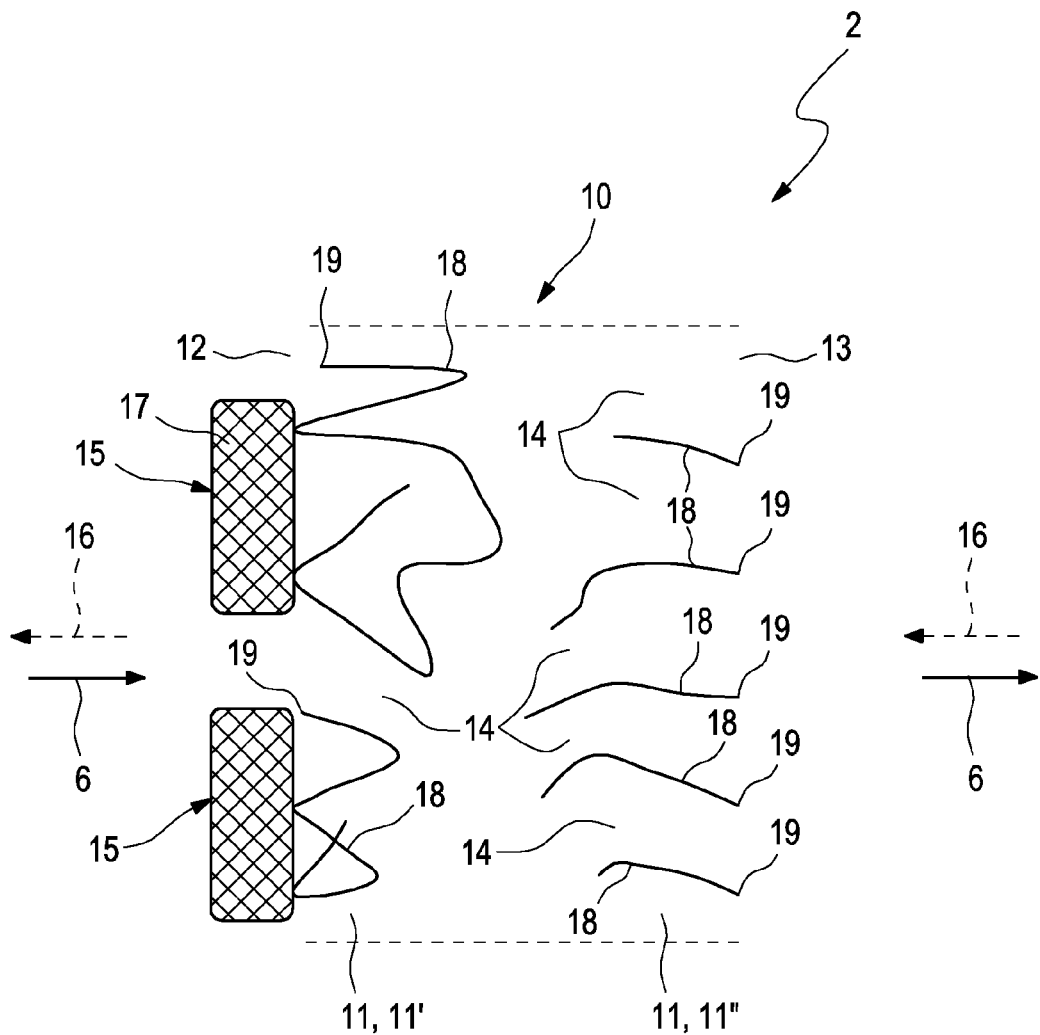

FIG. 5 shows another exemplary embodiment in which different filter materials 11', 11" are used on the first side 12 and on the second side 13. Here, both filter materials 11', 11" have fibers 18, wherein the fiber material 11' on the first side 12 has less free ends 19 than the filter material 11" has on the second side 13. This also results in the fact that the porosity or the number of body pores 14 is less on the first side 12 than on the second side 13.

The lesser porosity of the filter body 10 on the first side 12 in comparison to the second side 13 results in the fact that overall, the first side 12 is formed to be smoother or flatter and also more stable than the second side 13. In other words: The surface of the first side 12 is smoother or flatter and also more stable than the surface of the second side 13.

According to the invention, a nano-fiber layer 15 is applied on at least some sections of the first side 12. This has the advantage that a smoother or flatter surface is provided for the nano-fiber layer 15 on the first side 12, which has the lower porosity, so that the nano-fiber layer can be applied on the first side 12 in a simpler manner. Moreover, the nano-fiber layer 15 is better supported on the first side 12 so that it is more resilient. This means that the nano-fiber layer 15 can withstand higher flow velocities of the fluid to be filtered. Thus, the nano-fiber layer 15 is also mechanically more resilient so that the contaminants or dirt particles of the fluid to be cleaned can impinge with higher impulses on the nano-fiber layer 15 without damaging or destroying it.

The nano-fiber layer 15 and the filter material 11 serve for filtering the fluid to be cleaned. In the shown arrangement of the filter element 2 of the filter device 1, filtering the fluid takes place primarily in the region of the first side 12 due to the arrangement of the nano-fiber layer and/or the lower porosity of the first side 12 so that the dirt particles of the fluid or the contaminants of the fluid are separated primarily in the region of the first side 12. In the shown arrangement of the filter element 2, the filter element 2 thus can be designated as surface filter. It is possible to clean the filter element 2 by cleaning the filter element 2 using a cleaning fluid that flows through the filter element 2 in the direction 16 opposite the flow direction 6. Thus, the dirt particles or contaminants of the fluid to be cleaned which are separated in the region of the first side 12 can be flushed out of the filter element 2. This increases the service life of the filter element 2 and/or improves the filtering effect and the efficiency of the filter element 2.

The nano-fiber layer 15 has nano-fibers which usually have a diameter of several hundred nanometers or less. Here, the first side 12 is covered with the nano-fiber layer 15 at least in some sections. The embodiment shown in FIG. 3 shows a variant in which, in the cut-out shown, such a nano-fiber layer 15 is applied which covers the entire surface of the filter material 11. In contrast, in the embodiments shown in the FIGS. 2 and 5, two such nano-fiber layers 15 are shown which are applied spaced apart from one another on the first side 12 and cover the surface of the filter body 10 or the filter material 11 in a segment-like manner. FIG. 4 likewise shows such a nano-fiber layer 15 which covers the surface of the filter body 10 only in a sub-section, wherein the edge section of the filter body 10 is not covered by the nano-fiber layer 15.

The respective nano-fiber layer 15 likewise exhibits a porosity that is a result of the pores 17 arranged in the nano-fiber layer, which pores hereinafter are designated as nano-fiber pores 17. Here, the respective nano-fiber layer 15 in the shown embodiments has purely as an example a porosity that is constant, wherein nano-fiber layers 15 with varying porosities can also be used. It can further be observed that the nano-fiber pores 17 of the respective nano-fiber layer 15 are smaller than the body pores 14 of the filter body 10. Thus, the respective nano-fiber layers 15 have less porosity than the associated filter bodies 10. It is therefore in particular possible to separate smaller dirt particles from the fluid to be filtered with the aid of the nano-fiber layer 15 than with the filter body 10.

The respective nano-fiber layer 15 can be made from any material. Likewise, the respective filter body 10 can be made from any filter material 11 or any different filter materials 11. The filter body 10 can in particular be made from a fiber-containing filter material 11. Examples for this are cellulose-containing filter materials 11 and/or a fiber mixture from cellulose and synthetic fibers 18 and/or glass fibers 18.

The invention claimed is:

1. A filter element for a filter device, comprising:
   a filter body including at least one filter material for filtering a fluid,
   the filter body having a first side and a second side facing away from the first side,
   the filter body including a plurality of body pores, wherein the filter body has a porosity lower on the first side than on the second side, and
   a nano-fiber layer disposed at least partially on the first side,
   wherein the first side of the filter body corresponds to a dirty side to be penetrated by a fluid flow of the fluid to be filtered,
   wherein the filter body includes a plurality of fibers each terminating at a free end, and wherein the free end of the plurality of fibers on the first side are at least one of softer and more rounded than the free end of the plurality of fibers on the second side.

2. The filter element according to claim 1, wherein an average size of the plurality of body pores on the first side is smaller than an average size of the plurality body pores on the second side.

3. The filter element according to claim 1, wherein the porosity of the filter body increases in at least one transition step from the first side towards the second side at least in one region along a flow direction.

4. The filter element according to claim 1, wherein the porosity of the filter body increases continuously from the first side towards the second side at least in one region along a flow direction.

5. The filter element according to claim 1, wherein the filter body is composed of a fiber-containing filter material.

6. The filter element according to claim 1, wherein the filter body is composed of a cellulose-containing filter material.

7. The filter element according to claim 1, wherein the filter body is at least one of skimmed and screened from a filter material liquid containing the filter material to define the lower porosity of the first side than on the second side.

8. The filter element according to claim 1, wherein the nano-fiber layer disposed on the first side includes a plurality of nano-fiber pores, the nano-fiber layer having a porosity less than the first side of the filter body.

9. The filter element according to claim 8, wherein the plurality of nano-fiber pores of the nano-fiber layer are smaller than the plurality of body pores of the filter body.

10. The filter element according to claim 5, wherein the fiber-containing filter material includes a plurality of fibers each having a fiber end disposed throughout the first side and the second side, wherein a number of fiber ends on the first side is smaller than on the second side.

11. The filter element according to claim 10, wherein the number of fiber ends on the first side is reduced compared to the second side via a pre-treatment.

12. The filter element according to claim 10, wherein the number of fiber ends on the first side is reduced compared to the second side via the first side being composed of a different filter material than the second side.

13. The filter element according to claim 10, wherein the first side includes at least one of softer fibers and more rounded fibers than the second side.

14. The filter element according to claim 10, wherein the filter material on the first side further includes a filament.

15. The filter element according to claim 14, wherein the filament is a continuous filament.

16. The filter element according to claim 2, wherein the at least one filter material includes a plurality of fibers.

17. The filter element according to claim 3, wherein the nano-fiber layer includes a plurality of nano-fiber pores, the plurality of pores defining a porosity of the nano-fiber layer less than the first side of the filter body.

18. The filter element according to claim 4, wherein the nano-fiber layer includes a plurality of nano-fiber pores, the plurality of pores defining a porosity of the nano-fiber layer less than the first side of the filter body.

19. A filter device, comprising:
   a housing defining a cavity;
   a filter element disposed in the cavity of the housing, the filter element separating the cavity of the housing into a dirty side and a clean side downstream the dirty side with respect to a flow direction, the filter element including:
      a filter body including at least one porous filter material for filtering a fluid, the filter body defining a first side disposed at the dirty side and a second side at the clean side, wherein a porosity of the filter material is lower on the first side than the second side;
      wherein the filter material includes a plurality of fibers each terminating at a free end, and wherein the free end of the plurality of fibers on the first side are at least one of softer and more rounded than the free end of the plurality of fibers on the second side; and
      a nano-fiber layer including a plurality of pores disposed on the first side of the filter body;
   wherein the nano-fiber layer has a porosity less than the first side of the filter body.

20. A filter element for a filter device, comprising:
   a filter body including a filter material for filtering a fluid;
   the filter material having a first side and a second side facing away from the first side;
   the filter material including a plurality of body pores, wherein the filter body has a porosity lower on the first side than on the second side;
   the filter material including a plurality of fibers each extending continuously between at least two free ends, wherein a number of free ends of the plurality of fibers on the first side is less than a number of fiber ends on the second side; and
   a nano-fiber layer disposed at least partially on the first side.

* * * * *